Figure 1:
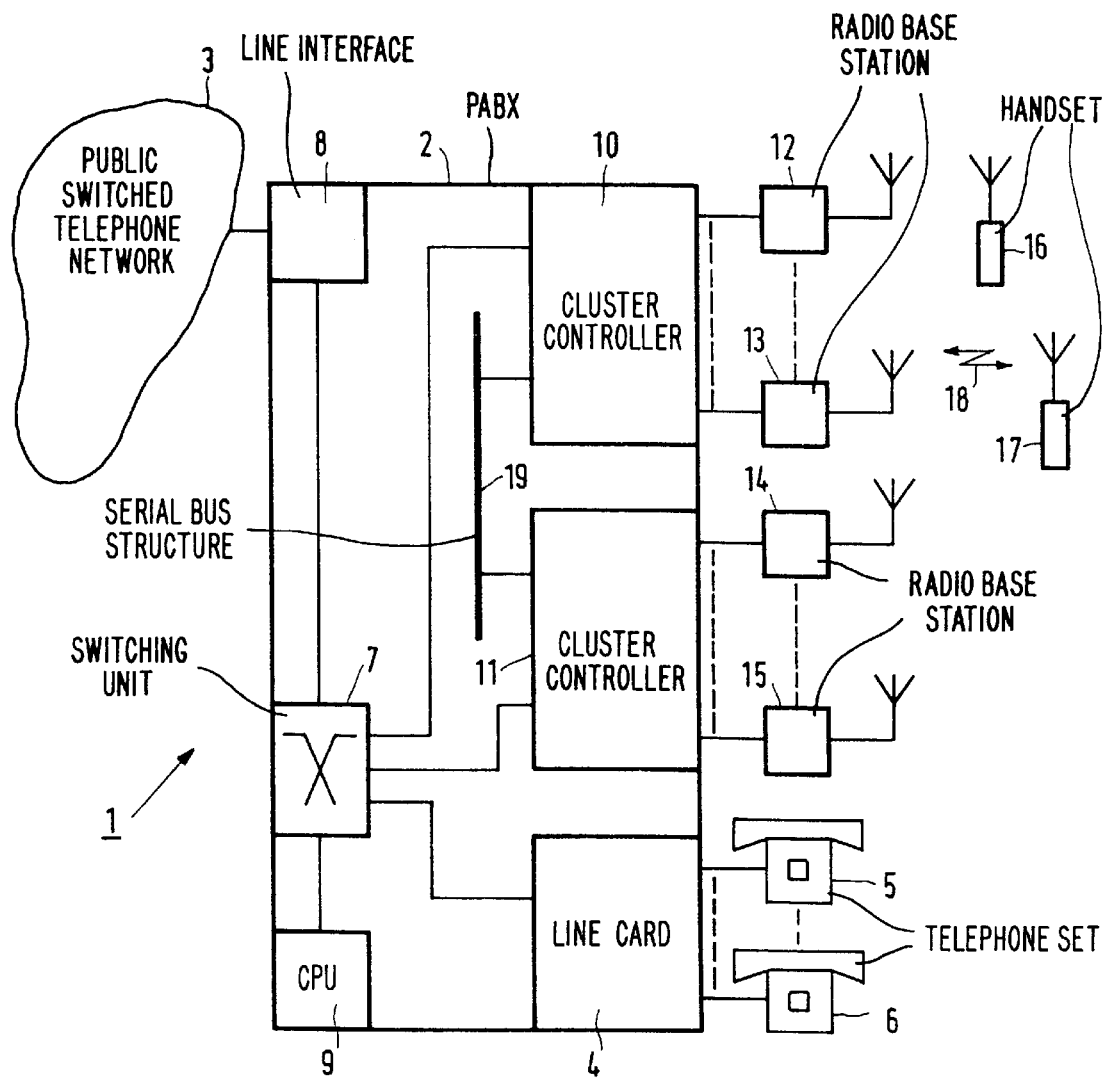

United States Patent [19]
Havermans et al.

[11] Patent Number: 5,812,548
[45] Date of Patent: Sep. 22, 1998

[54] COMMUNICATION SYSTEM, A PRIVATE AUTOMATIC BRANCH EXCHANGE, AND A LINE CARD

[75] Inventors: Gerardus M.J. Havermans, Baarn; Heert R. Kamstra, Naarden, both of Netherlands

[73] Assignee: U.S. Philips Corporation, New York, N.Y.

[21] Appl. No.: 564,886

[22] Filed: Nov. 29, 1995

[30] Foreign Application Priority Data

Dec. 1, 1994 [EP] European Pat. Off. .............. 94203493

[51] Int. Cl.$^6$ .............................. H04J 3/24; H04L 12/40
[52] U.S. Cl. ............................ 370/353; 370/458; 370/582
[58] Field of Search .................................. 370/214, 329, 370/331, 336, 337, 347, 352, 353, 354, 433, 434, 442, 443, 447, 458, 460, 461, 476, 477, 522, 528, 537; 379/58, 59, 60, 61, 63; 455/33.1, 33.2, 33.4, 54.1, 56.1

[56] References Cited

U.S. PATENT DOCUMENTS

| | | | |
|---|---|---|---|
| 3,988,545 | 10/1976 | Kuemmerle | 370/537 |
| 4,731,785 | 3/1988 | Ferenc et al. | 370/537 |
| 4,884,264 | 11/1989 | Servel et al. | 370/422 |
| 5,327,428 | 7/1994 | Van As et al. | 370/353 |
| 5,392,280 | 2/1995 | Zheng | 370/353 |
| 5,402,422 | 3/1995 | Liu et al. | 370/443 |
| 5,418,838 | 5/1995 | Havermans et al. | 379/59 |
| 5,631,906 | 5/1997 | Liu | 370/455 |

FOREIGN PATENT DOCUMENTS

| | | |
|---|---|---|
| 0491202A2 | 6/1992 | European Pat. Off. . |
| 0505658A1 | 9/1992 | European Pat. Off. . |
| 0595392A1 | 5/1994 | European Pat. Off. . |

OTHER PUBLICATIONS

"Overview of the MetaRing architecture", Y. Ofek, Computer Networks and ISDN Systems, vol. 26, 1994, pp. 817–829.

"Sophio–S15/25/35: the architecture of a small digital communication switch", D.J. Anderson et al., Philips Telecommunication Review, vol. 49, No. 1, Mar 1991, pp. 8–17.

"Cordless Telecommunications in Europe", W.H.W. Tuttlebee, Springer–Verlag 1990, pp. 273–284.

Primary Examiner—Alpus H. Hsu
Attorney, Agent, or Firm—Steven R. Biren

[57] ABSTRACT

In a known communication system, synchronous and asynchronous traffic is exchanged between stations using a common communication path, wherein the communication system includes a complicated controlling mechanism for controlling fair allocation of asynchronous traffic. A communication system as disclosed herein includes a simple fairness mechanism for fair allocation of asynchronous traffic to the stations without a scheduler being necessary. To this end, the communication system exchanges information between the stations via the communication path in a frame of synchronous time slots and an asynchronous time slot, the synchronous time slots including an access bit for demanding access to the asynchronous time slot. All stations monitor all access bits of the other stations and set their own access bit in accordance with a set of fairness rules.

8 Claims, 2 Drawing Sheets

COMMUNICATION SYSTEM, A PRIVATE AUTOMATIC BRANCH EXCHANGE, AND A LINE CARD

BACKGROUND OF THE INVENTION

1. Field of the Invention

The present invention relates to a communication system, in particular to a cordless telephony system, comprising a communication path accessible for a plurality of path using arrangements which are arranged for exchanging a mixture of synchronous and asynchronous traffic via the communication path.

The present invention further relates to a private automatic branch exchange and to a line card for a private automatic branch exchange.

2. Discussion of the Related Art

A communication system of the above kind is known from the European Patent Application EP 0 491 202 in which in fixed time slots, in packet time slots, and in signalling time slots information is exchanged between stations via a communication path. For getting access to a packet time slot, the station transmits a priority number and a packet length in a token in a signalling time slot in the communication path. Only if a transmitted token is received undisturbed by itself, the station is permitted to transmit its packet. The station calculates the starting point of time for transmitting the packet from other tokens in the signalling channels. Also, when no access is gained, the station augments its priority number. Such a system is complicated because each station has to know the packets lengths of the asynchronous packets of the other stations and the transmission points of time.

Other communication systems with mixed asynchronous traffic are known in which a scheduler is known to control the asynchronous traffic. In the European Patent Application EP 0 505 658 a local area network is described in which a scheduler is responsible for allocating sled 'gratis slots'. The scheduler applies a fairness algorithm for allocating the gratis slots on the basis of counts counting the number of gratis slots used in network nodes. Such a system is complicated and requires extra hardware. An even more complicated system using a scheduler is disclosed in the U.S. Pat. No. 3,988,545.

In the article "Overview of the MetaRing architecture", Y. Ofek, Computer Networks and ISDN Systems, Vol. 26, 1994, pp. 817–829, a double ring structure is disclosed in which a token circulates in an opposite direction to traffic. Asynchronous traffic can be injected into network nodes. A fairness algorithm using counters counting the number of transmitted data units in a node, as communicated by means of the token, controls the asynchronous traffic. Such a fairness mechanism is complicated and confined to a double ring structure.

SUMMARY OF THE INVENTION

It is an object of the present invention to provide a communication system with mixed synchronous and asynchronous traffic exchanged between path using arrangements on a communication path, in which system asynchronous traffic is handled in a simple and in a fair way, without collisions to occur as to the asynchronous traffic.

To this end the communication system according to the present invention is characterized in that the communication path comprises at least one serial bus for exchanging the traffic in time slots for synchronous communication and in a time slot for asynchronous communication, the system being arranged for coupling use of the asynchronous time slot to use of a synchronous time slot assigned to a path-using arrangement, while applying a fairness mechanism for fair allocation of the use of the asynchronous time slot to the use of a synchronous time slot. The present invention is based upon the insight that by coupling the use of the asynchronous time slot to the use of a synchronous time slot, a scheduler can be dispensed with. Also, such coupling renders the fairness mechanism simple.

In an embodiment of a communication system according to the present invention, the synchronous traffic from the path using arrangements has the same priority and the synchronous time slots comprise demand fields indicating whether or not the asynchronous time slot is demanded, and wherein the fairness mechanism implies monitoring by the path using arrangements of each others demand fields and implies putting by the path using arrangements of demands for the asynchronous time slot in the demand fields in dependence of the monitored demands such that the asynchronous time slot is allocated in a fair way. Based upon the insight that the path using arrangements 'see' each other, it is achieved that the path using arrangements can take a decision to put a demand on the communication path for the asynchronous time slot independently, i.e. no separate and centralized asynchronous traffic control is necessary. By applying equal priority for each coupled synchronous time slot, a very simple fairness mechanism can be applied.

In a further embodiment of a communication system according to the present invention, the synchronous time slots and the asynchronous time slot form a frame, and wherein the fairness mechanism implies a set of rules comprising at least the following rules:

a) if in a current frame less than two demands are put, a path using arrangement occupying a lowest numbered synchronous time slot is permitted to put a demand, b) in a current frame, a path using arrangement occupying a given numbered synchronous time slot is permitted to put a demand if no other path using arrangement occupying a lower numbered synchronous time slot has a demand, and c) in a frame immediately succeeding a current frame, a next prioritized but not granted demand in the current frame is granted in the succeeding frame. Herewith, one demand per frame is accepted, i.e. a path using arrangement allocated to a synchronous time slot having a lower number will have to wait at least one frame for putting a next demand when its demand is granted in the current frame. This embodiments renders a minimum fairness solution.

In a further embodiment of a communication system according to the present invention, the set of rules further comprises the rule:

if in a current frame a path using arrangement occupying a given numbered synchronous time slot is permitted to put a demand, all path using arrangements occupying higher numbered synchronous time slots are also permitted to put a demand. Herewith, within a cycle of n frames asynchronous access is guaranteed for each path using arrangement, n being the number of synchronous time slots in the frame, i.e. a minimum information conveying time is guaranteed per path using arrangement occupying a synchronous time slot.

In a still further embodiment of a communication system according to the present invention, the set of rules further comprises the rule:

if in a current frame more than one demand is put, a path using arrangement which demand is granted in the current frame is not permitted to put a demand in the next successive frame. Herewith, it is prevented that a lowest numbered time slot in the frame will dominate other time slots, so that a minimum response time is guaranteed for each synchronous time slot to get granted a demand for the asynchronous time slot.

Further embodiments are claimed in the dependent claims, such as the system being a cordless telephony system in which the path using arrangements are cluster controllers for controlling a cluster of cordless telephony radio base stations, such cluster controllers being line cards in a private automatic branch exchange, for instance. In such a system the serial bus or busses, or so-called backbone bus as described in the European Patent Application EP 0 595 392 (U.S. Ser. No. 08/143,267 filed Oct. 26, 1993), is used for exchanging control information between the cluster controllers, in particular handover or roaming information. Such a cordless telephony system with a private automatic branch exchange having a cordless extension forms a microcellular telephony system.

The communication system according to the present invention is not limited to cordless telephony, but may be another mixed asynchronous and synchronous traffic system with decentralized control in which decentralized units exchange asynchronous traffic via a serial bus structure.

BREIF DESCRIPTION OF THE DRAWINGS

Figure 2:
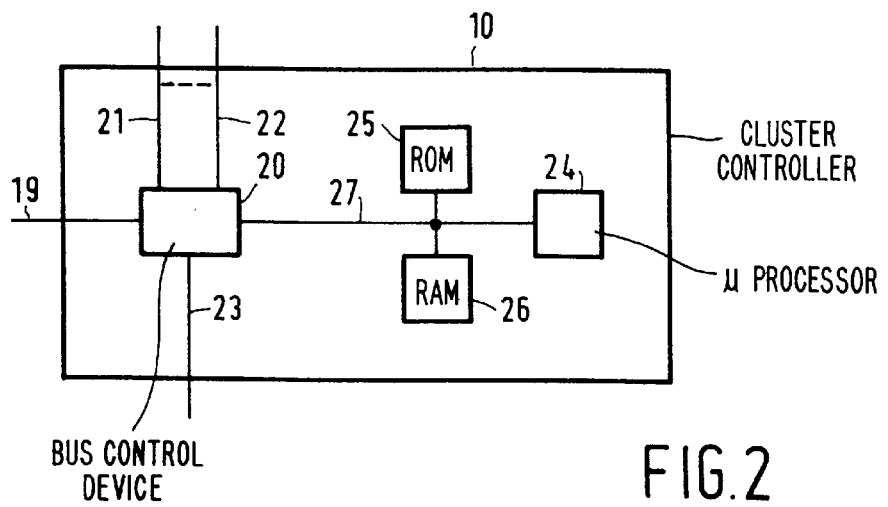
Figure 3:
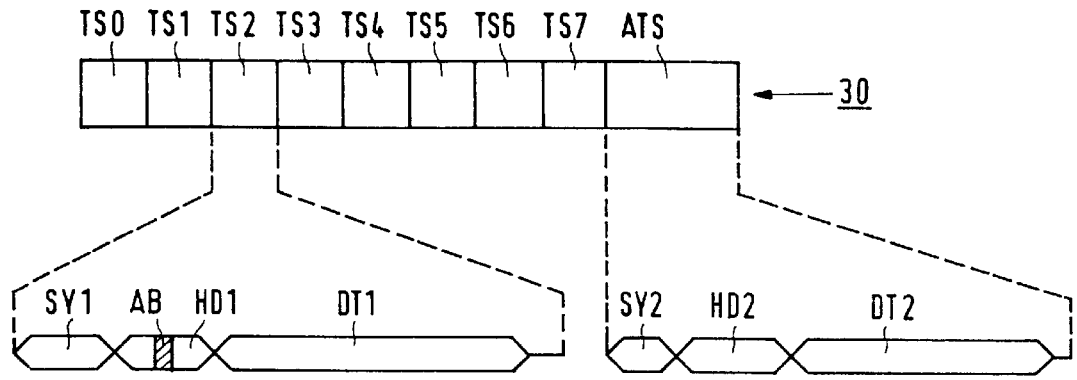
Figure 4:
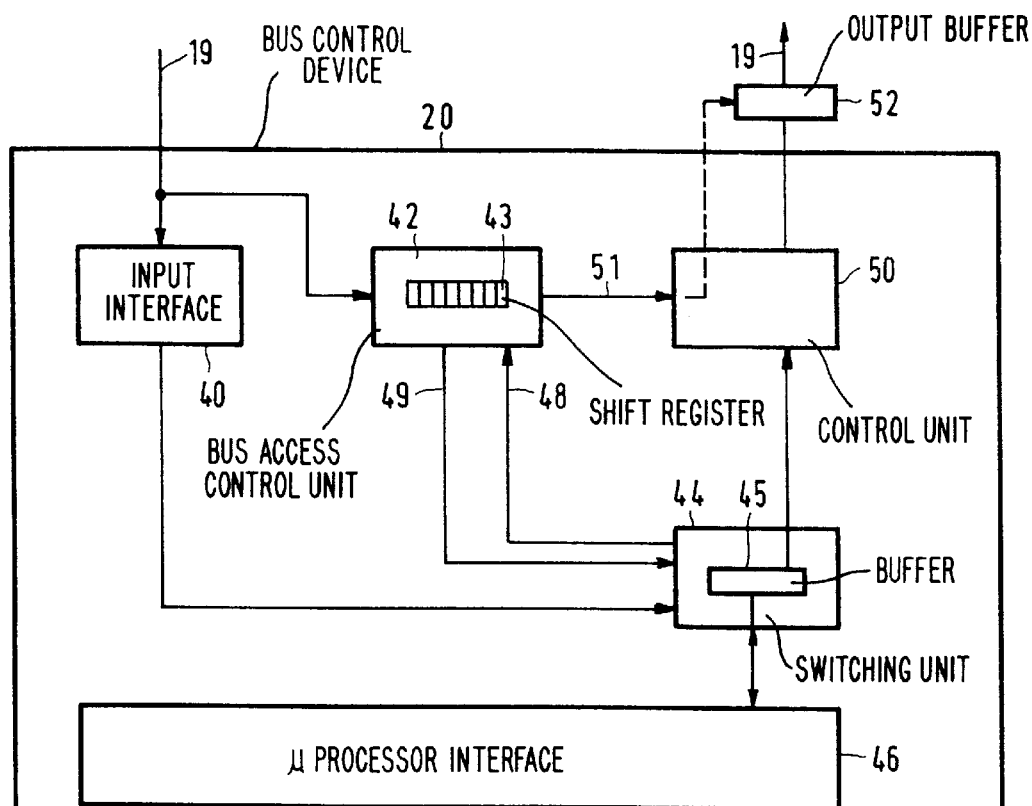
Figure 5:
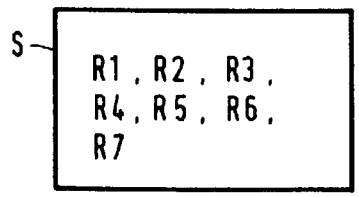

The present invention will now be described, by way of example, with reference to the accompanying drawings, wherein:

FIG. 1 schematically shows a communication system according to the present invention, FIG. 2 shows a cluster controller for use in a communication system according to the present invention, FIG. 3 shows a frame on a bus structure according to the present invention, FIG. 4 shows a bus control device according to the present invention for the cluster controller, and FIG. 5 shows a set of rules implemented by a bus access control unit according to the present invention.

Throughout the figures the same reference numerals are used for the same features.

DETAILED DESRIPTION OF THE PREFERRED EMBODIMENTS

FIG. 1 schematically shows a communication system 1 according to the present invention comprising a private automatic branch exchange or PABX 2 which can be coupled to a public switched telephone network 3 which can be either an analog or a digital network. The PABX 2 comprises an analog or a digital line card 4 for coupling a plurality of fixed telephone sets 5 and 6 to the switched telephone network 2 inter alia, via a switching unit 7 and a line interface unit 8. When analog telephone sets are to be connected to the PABX 2, the line card 4 is an analog line card, when ISDN (Integrated Services Digital Network) telephone sets are to be connected to the PABX 2, the line card 4 is a digital line card. The PABX 2, which preferably is a digital branch exchange, further comprises a central processing unit 9 for controlling the switching unit 7 inter alia. Such a PABX structure is well-known in the art and is described in more detail in the article "SOPHO-S15/25/35: The architecture of a small digital communication switch", D. J. Anderson et al., Philips Telecommunication Review, Vol. 49, No. 1, March 1991, pp. 8–17, for instance. For cordless extension, the PABX 2 further comprises a plurality of cluster controllers 10 and 11, put on line cards, for controlling cordless telephony radio base stations 12 and 13, and 14 and 15, respectively. The base stations 12, 13, 14, and 15 can communicate with cordless telephony handsets 16 and 17 by radio link. As shown, a radio link 18 exists between the handset 17 and the base station 13. The base stations 12, 13, 14, and 15, and the handsets 16 and 17 can operate in accordance with the so-called DECT Standard (Digital European Cordless Telecommunications), as described in the handbook "Cordless Telecommunications in Europe", W. H. W. Tuttlebee, Springer-Verlag 1990, pp. 273–284. The PABX 2 further comprises a serial bus structure 19 as a communication path between the cluster controllers 10 and 11. Such a bus structure per se is described in more detail in said European Patent Application EP 0 595 392 (US Ser. No. 08/143,267 filed Oct. 26, 1993), the contents of which herewith being incorporated by reference. By applying such a bus structure 19, simplifies the task of the central processing unit 9. Namely, in case the handset 17 is roaming from the cluster controller 10 to the cluster controller 11, for instance, message transfer for a then necessary handover is done via the bus structure 19 which forms a so-called backbone structure for the cluster controllers 10 and 11. Furthermore, as to this microcellular cordless extension, the PABX 2 'sees' the cluster controller line cards as normal analog or digital line cards for fixed telephone sets. As will be described in the sequel, the present invention is concerned with a fairness mechanism for fair allocation of asynchronous time slots on the bus structure 19.

FIG. 2 shows the cluster controller 10 for use in the communication system 1 according to the present invention, comprising a bus control device 20 which is a so-called backbone circuit which is coupled to the bus structure 19, to the base stations 12 and 13 via links 21 and 22, respectively, to the switch 7 via a link 23, and to a microprocessor 24, a ROM memory 25 (Read Only Memory) for a stored program, and a RAM memory 26 via a microprocessor bus 27. The microprocessor 24 executes a stored program implementing DECT-functionality such as radio base station control, and uses the bus structure 19. According to the present invention, the microprocessor 24 communicates with other microprocessors (not shown) in other cluster controllers via an asynchronous time slot to be shown in the sequel.

FIG. 3 shows a frame 30 on the bus structure 19 according to the present invention. In an embodiment of the present invention, the bus structure 19 comprises four serial busses, allowing interconnection of 32 cluster controllers, such as described in more detail in said European Patent Application EP 0 595 392. The frame 30, having a length of 125 μsec, comprises eight time slots TS0, TS1, TS2, TS3, TS4, TS5, TS6, and TS7 for synchronous communication, and one time slot ATS for asynchronous communication. The synchronous time slots TS0 to TS7 comprise a synchronization pattern SY1, a synchronous time slot header HD1, and 32 octets of data DT1, as shown for the time slot TS2, for instance. The asynchronous time slot ATS comprises a sync pattern SY2, a asynchronous time slot header HD2, and a 48 octets of data DT2. Herewith, eight synchronous 2 Mbits/s channels having the same structure as a customary 2 Mbit PCM (Pulse Code Modulation) channel, and a single 3.5 Mbit/sec asynchronous channel are available in the frame 30. According to the present invention, the synchronous time slot header HD1 comprises an access bit AB for indicating a demand for the asynchronous time slot ATS. Thus, the use of the asynchronous time slot ATS is always coupled to the use of a synchronous time slot. As a matter of fact, more than one synchronous time slot can demand the asynchronous time slot ATS. A fairness mechanism is provided controlling putting of demands and handling of demands.

FIG. 4 in more detail shows the functionality of the bus control device 20, according to the present invention for the cluster controller 10. The bus control device 20 comprises an input interface 40 which at input side is coupled to the backbone bus 19. For the purpose of the present invention, at input side each bus control device 20 monitors the bus 19. The input interface 40 reads the access bits AB from the headers HD1 of each synchronous time slots and transfers the access bits AB to a bus access control unit 42 which comprises a shift register 43 for storing the eight access bits AB with each new frame. In a preferred embodiment of the present invention, the bus access control unit 42, which is a programmed device and which implements the fairness mechanism according to the present invention, guarantees that a demand is granted within a maximum of eight frame periods. The bus access control unit 42 is coupled to an asynchronous time slot switching unit 44 having a message buffer 45 for storing a message to be transferred via asynchronous time slot ATS. The asynchronous time slot switching unit 44, monitoring all frames from all the cluster controllers in the system 1, only switches data from asynchronous time slots from other cluster controllers to the microprocessor 24. At input side, selection is done on the basis of address information (not shown) in the headers HD2. If the microprocessor 24 has a message to be transferred via the asynchronous time slot ATS, this is signalled to the bus control device 20, which transfers this message to the buffer 45. The microprocessor 24 is coupled to the buffer 45 by means of a microprocessor interface 46. If the buffer 45 is full, this condition, which implies a demand for the asynchronous time slot ATS, is signalled to the bus access control unit 42 by the asynchronous time slot switching unit 44 via a signalling link 48. If the bus access control unit 42 grants a demand, it sends a signalling message via a signalling link to the asynchronous time slot switching unit 44 to transmit the contents of the buffer 45 to a bus output control unit 50, which at the same time receives a bus enable signal via a signalling link 51. Herewith, an external tri-state output buffer 52 is enabled so that the demand is granted and the message from the microprocessor 24 is put onto the bus 19, in the asynchronous time slot ATS.

FIG. 5 shows a set of rules S applied by the bus access control unit 42 according to the present invention, in a way and in combinations as described in the introduction of the present invention and preferably implemented as a programmed device in an ASIC (Application Specific Integrated Circuit), comprising the following rules:

R1: if in a current frame 30 less than two demands AB are put, a path using arrangement, such as the arrangements 10 and 11, occupying a lowest numbered synchronous time slot, among the successive time slots TS0 to TS7, is permitted to put a demand;

R2: in a current frame, a path using arrangement occupying a given numbered synchronous time slot is permitted to put a demand if no other path using arrangement occupying a lower numbered synchronous time slot has a demand;

R3: if in a current frame a path using arrangement occupying a given numbered synchronous time slot is permitted to put a demand, all path using arrangements occupying higher numbered synchronous time slots are also permitted to put a demand;

R4: in a frame immediately succeeding a current frame, a next prioritized but not granted demand in the current frame is granted in the succeeding frame; and R5: if in a current frame more than one demand is put, a path using arrangement which demand is granted in the current is not permitted to put a demand in the next successive frame.

According to the present invention each bus access control unit applies the same fairness mechanism which does not alter once the communication system 1 has been built. Such a preferred embodiment can be an embodiment in which the bus control device 20 is an ASIC or a part of an ASIC. In an alternative embodiment of the present invention, the set of rules in the bus access control units 42 may be updated when the complete system is down, so as to adapt the system to customer specific requirements such as making a given path using arrangement dominant. Then, the bus control devices 20 are programmable. The set of rules S, which must be the same for each bus control device, can then be modified by a system engineer or the like.

Within the scope of the present invention, other or additional rules can be drafted. For instance, in order to prevent collisions, in case an access bit AB which was put by a path using arrangement becomes corrupted, as a rule R6, the path using arrangement having the highest priority in a current frame can also monitor its own access bit. If such a path using arrangement notices that its access bit AB has become corrupted, it is not permitted to put a demand in the next successive frame regardless whether or not it was permitted to do so on the bases of other rules. Herewith, the fairness mechanism becomes very robust. In a variant of the present invention, in which the rules R1 to R4 are applied and in which more than one demand per frame is put, without the rule R5 being applied, a mechanism of dynamical priorities of putting demands can be applied, in order to prevent path using arrangements to become dominant. For instance, as a rule R7, if a path using arrangement having asynchronous access to the bus 19 notices that m frames after a current access in a frame more than one demand is put, it is not permitted to put a demand in this frame, m being an integer. Herewith, a dominant frame is only allowed to maintain its dominance over m frames, when other less dominant frames try to get access. More generally, such a mechanism of dynamical priorities can be a function of a fixed priority and the number of times access to the asynchronous time slot ATS is granted.

We claim:

1. A communication system comprising a communication path accessible for a plurality of path-using arrangements which are arranged for exchanging a mixture of synchronous and asynchronous traffic via the communication path, characterized in that the communication path comprises at least one serial bus for exchanging the traffic in time slots (TS0 to TS7) dedicated only for synchronous communication and in a time slot (ATS) comprising means for asynchronous communication, the system one of the synchronous time slots for coupling use of the asynchronous time slot (ATS) to use of one of the (TS0 to TS7) assigned to a path-using arrangement while applying a fairness mechanism for fair allocation of the use of the asynchronous time slot (ATS) to the use of the one of the synchronous time slots (TS0 to TS7).

2. The communication system according to claim 1, wherein the synchronous traffic from the path using arrangements has a same priority and the synchronous time slots comprise demand fields (AB) indicating whether or not the asynchronous time slot is demanded, and wherein the fairness mechanism comprises means for monitoring by the path-using arrangements of each other path-using arrangements', demand fields (AB) and putting by the path-using arrangements of demands for the asynchronous time slot (ATS) in the demand fields (AB) in dependence of the monitored demands such that the asynchronous time slot is allocated in a fair way.

3. The communication system according to claim 2, wherein the synchronous time slots (TS0 to TS7) and the asynchronous time slot (ATS) form a frame, and wherein the fairness mechanism includes means for implementing a set of rules comprising at least the following rules:

a) if in a current frame less than two demands are put, a path-using arrangement occupying a lowest numbered synchronous time slot is permitted to put a demand, b) in a current frame, a path using arrangement occupying a given numbered synchronous time slot is permitted to put a demand if no other path using arrangement occupying a lower numbered synchronous time slot has a demand, and c) in a frame immediately succeeding a current frame, a next prioritized but not granted demand in the current frame is granted in the succeeding frame.

4. The communication system according to claim 3, wherein the set of rules further comprises the rule:

d) if in a current frame a path using arrangement occupying a given numbered synchronous time slot is permitted to put a demand, all path-using arrangements occupying higher numbered synchronous time slots are also permitted to put a demand.

5. The communication system according to claim 4, wherein the set of rules further comprises the rule:

e) if in a current frame more than one demand is put, a path-using arrangement which demand is granted in the current frame is not permitted to put a demand in the next successive frame.

6. The communication system according to claim 1, wherein the system further comprises a cordless telephony system in which the path-using arrangements are cluster controllers for controlling a cluster of cordless telephony radio base stations.

7. The communication system according to claim 6, wherein the cluster controllers comprise microprocessors for local processing, and the asynchronous time slot (ATS) is used for exchanging messages including handover messages between microcontrollers.

8. The communication system according to claim 6, still further comprising a private automatic branch exchange in which the cluster controllers are put on line cards to be put in line interface units which are coupled to the serial bus.

* * * * *